No. 739,617. PATENTED SEPT. 22, 1903.
S. D. POOLE.
BEDDING PLOW.
APPLICATION FILED APR. 6, 1901.
NO MODEL. 5 SHEETS—SHEET 1.
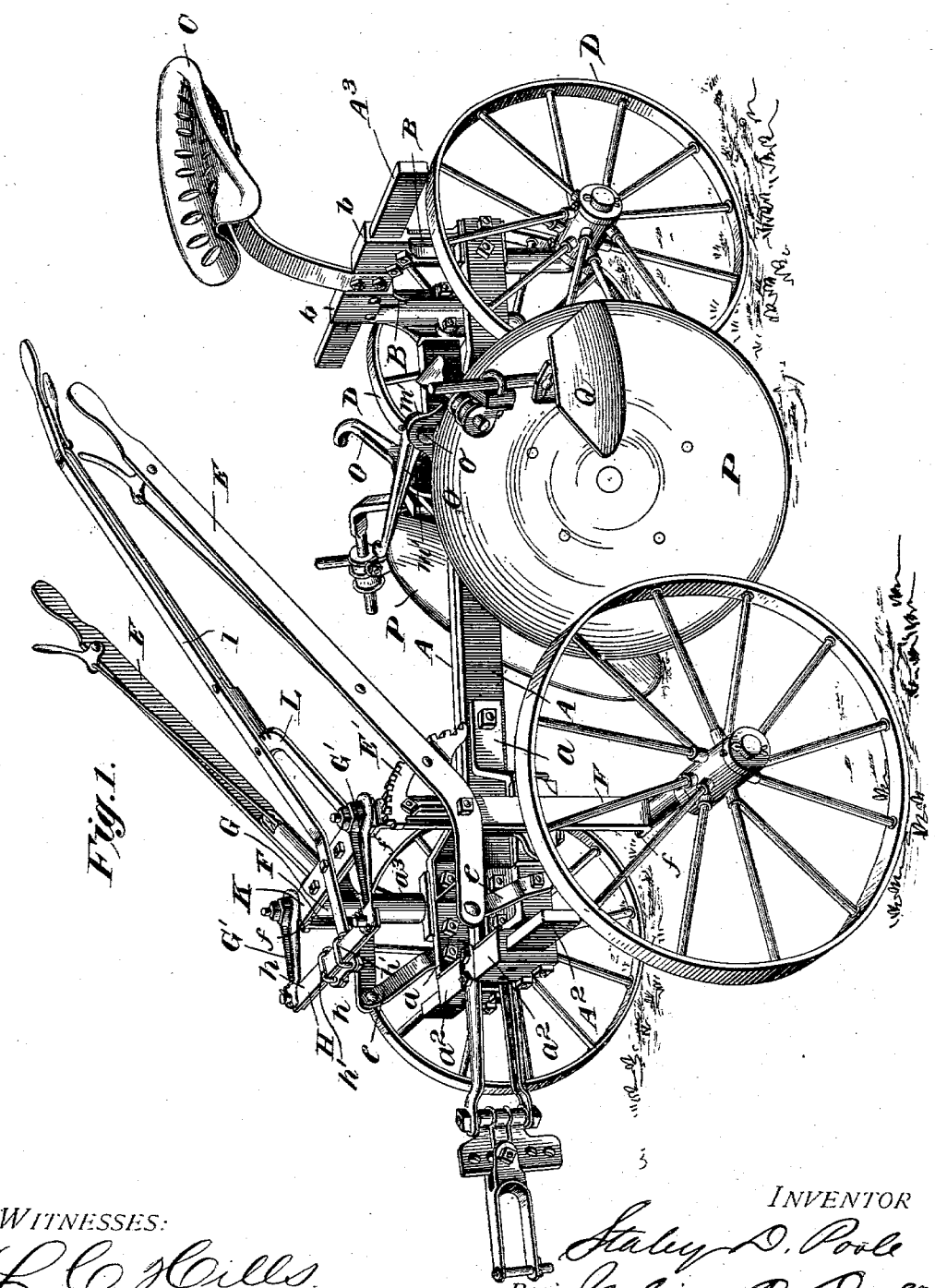
WITNESSES:
INVENTOR

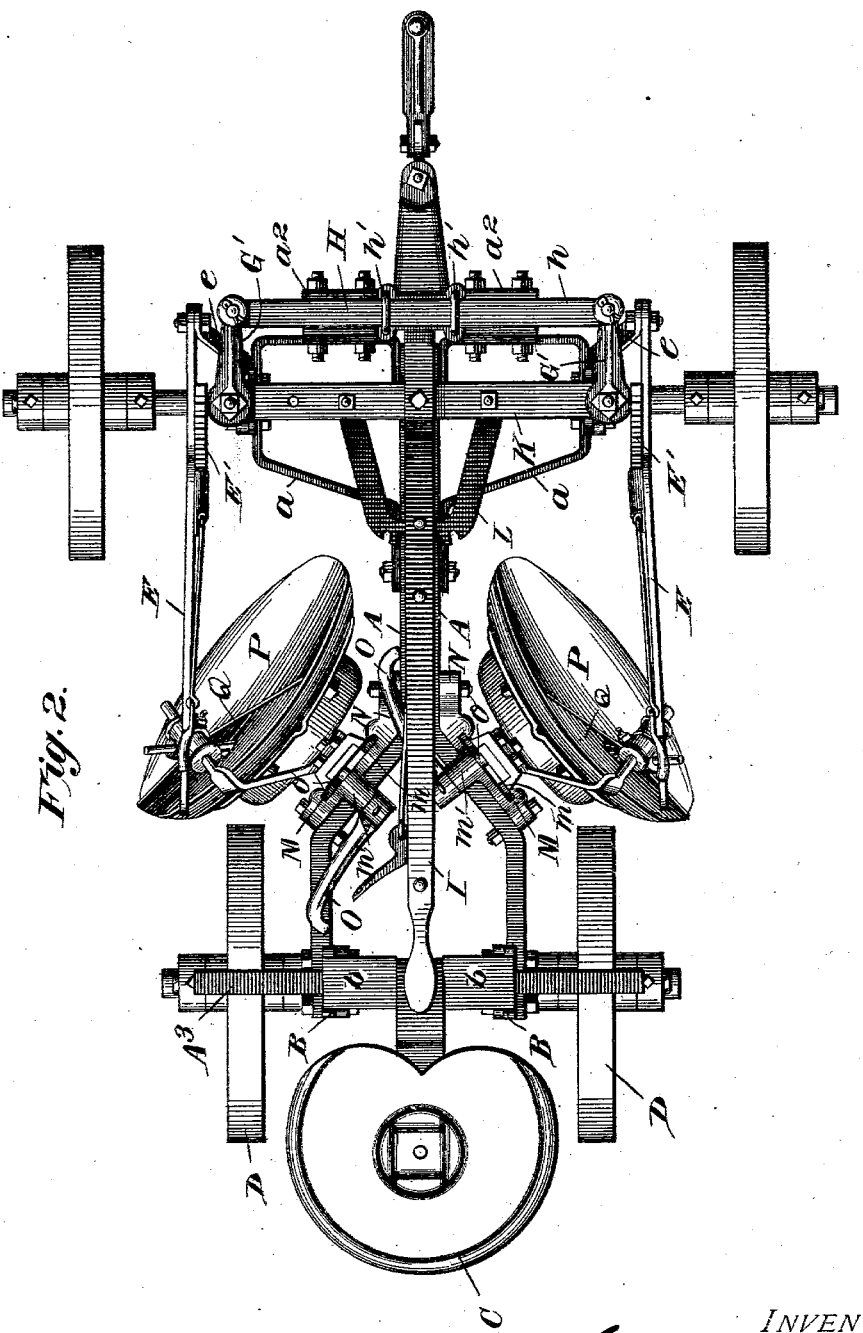

No. 739,617. PATENTED SEPT. 22, 1903.
S. D. POOLE.
BEDDING PLOW.
APPLICATION FILED APR. 6, 1901.
NO MODEL. 5 SHEETS—SHEET 3.
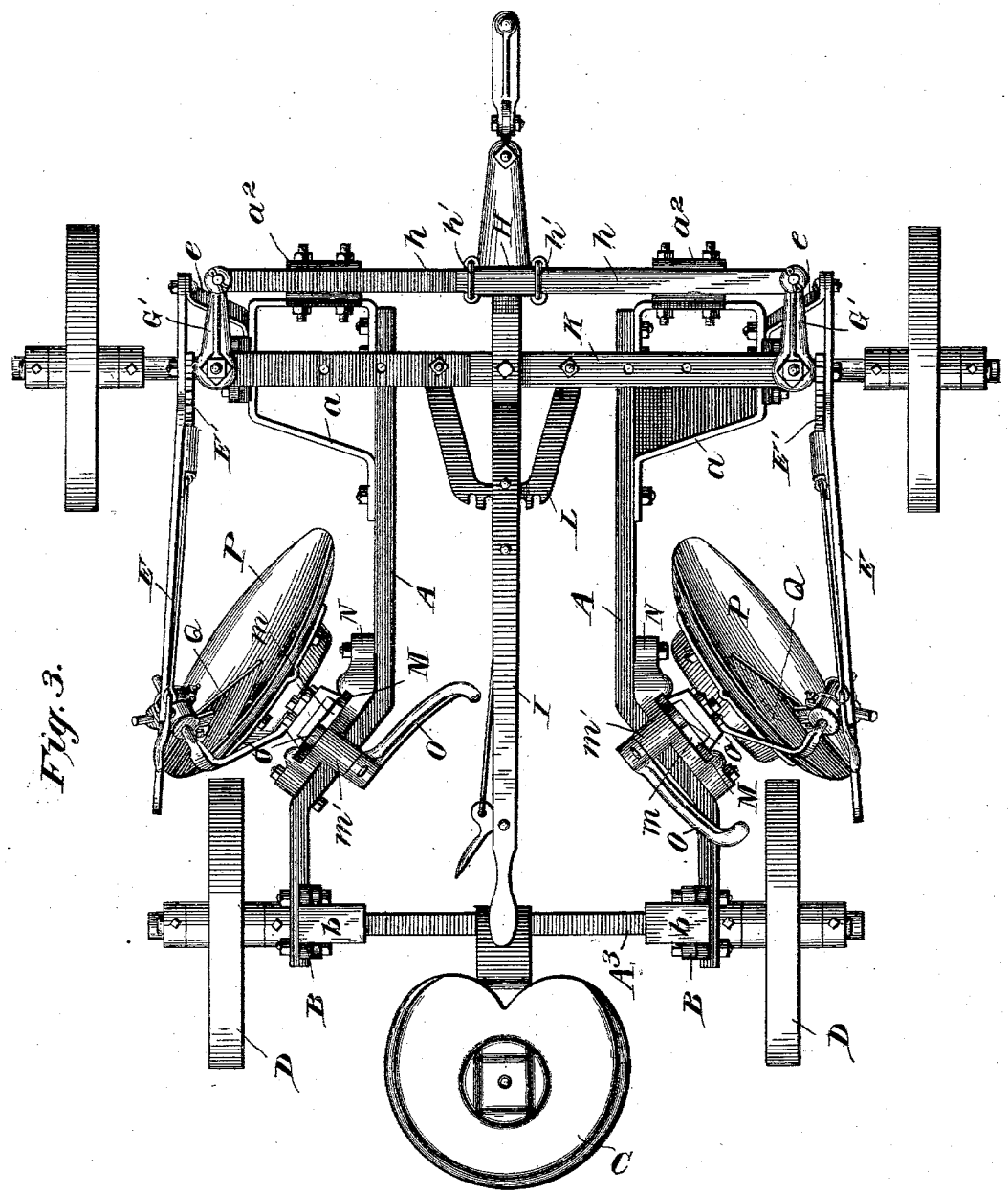

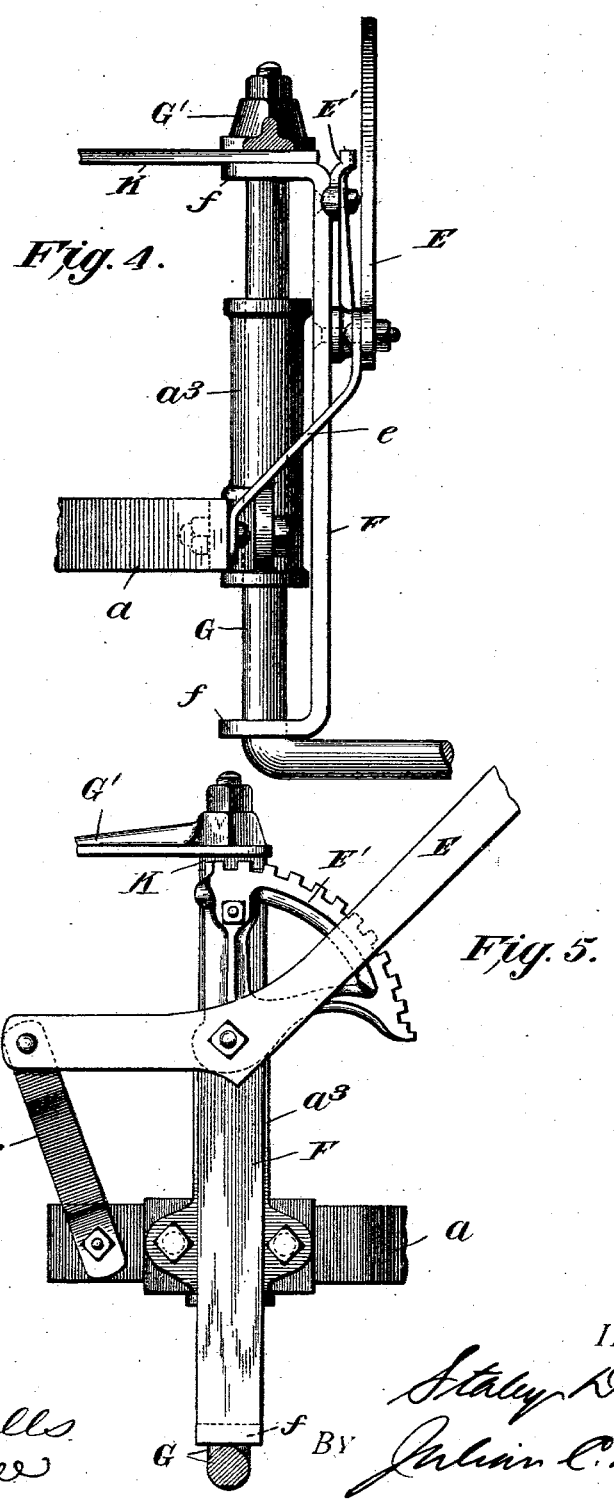

No. 739,617. PATENTED SEPT. 22, 1903.
S. D. POOLE.
BEDDING PLOW.
APPLICATION FILED APR. 6, 1901.
NO MODEL. 5 SHEETS—SHEET 5.
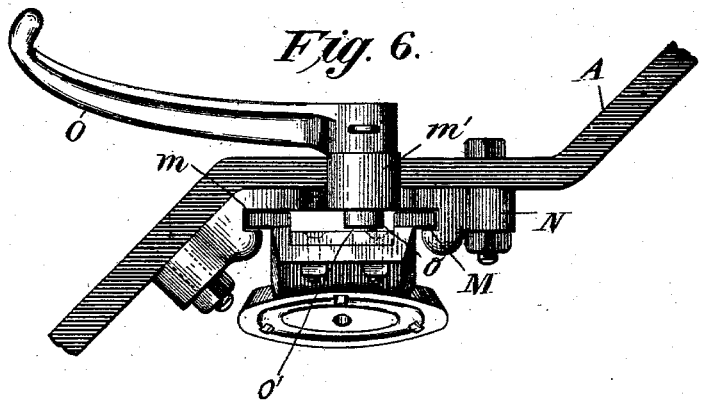
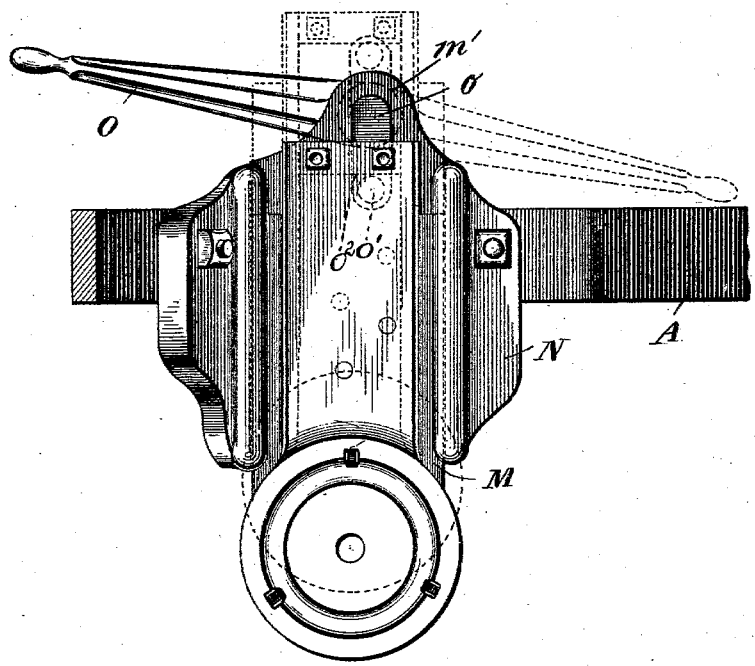
WITNESSES:
INVENTOR
Staley D. Poole
BY Julian C. Dowell
Attorney No. 739,617.  
Patented September 22, 1903.

UNITED STATES PATENT OFFICE.

STALEY D. POOLE, OF MOLINE, ILLINOIS, ASSIGNOR TO DEERE & COMPANY, OF MOLINE, ILLINOIS, A CORPORATION OF ILLINOIS.

BEDDING-PLOW.

SPECIFICATION forming part of Letters Patent No. 739,617, dated September 22, 1903.

Application filed April 6, 1901. Serial No. 54,736. (No model.)

*To all whom it may concern:*

Be it known that I, STALEY D. POOLE, a citizen of the United States, residing at Moline, in the county of Rock Island and State of Illinois, have invented certain new and useful Improvements in Bedding-Plows; and I do hereby declare the following to be a full, clear, and exact description of the invention, such as will enable others skilled in the art to which it appertains to make and use the same.

This invention relates to that class of agricultural implements which are employed for forming ridges for sugar-cane, beet-root, potatoes, and other vegetables usually planted in ridges; and its primary object is to provide a simple and efficient "disk" bedding-plow or implement for forming parallel ridges in sugar-cane or other lands.

The invention will first be hereinafter more particularly described with reference to the accompanying drawings, which are to be taken as a part of this specification, and then pointed out in the claims at the end of the description, said drawings illustrating one form of embodiment of my invention, in which rotary cutting-disks are used as the furrow-turning devices, though right and left hand turning-plows might be employed in place of the disks.

Similar letters of reference are used in said drawings to denote corresponding parts in different views.

Figure 1 represents a perspective view of my improved disk bedding-plow. Fig. 2 is a plan view of the same with the two sides or halves of the disk-supporting frame closed or brought close together. Fig. 3 is a plan view of the same, showing the two sides or halves of said disk-supporting frame separated. Figs. 4 and 5 are details showing in front and side elevation, respectively, the mechanism for raising and lowering the front wheels of the plow-frame; and Figs. 6 and 7 are details showing a top or plan view and a side elevation, respectively, of the mechanism for raising and lowering the disks or ridge-forming devices.

The disk-supporting frame consists, essentially, of two separable frame-bars, which are denoted in the drawings by the letters A A, having their front and rear ends adjustably supported on wheels in such manner that the disks carried by said frame-bars may be adjusted so as to place them close together or quite a distance apart and secure them in either of said positions or at any desired intermediate point.

In the form shown the frame-bars A are provided at their front ends with angle bars or braces $a\ a$, each having a clamping device or sleeve $a^2$ thereon, which is fitted upon a cross-bar $A^2$, so that said devices or sleeves may be adjusted and secured at any desired point on said cross-bar for the purpose of securing the front ends of the frame-bars A A at the desired distance apart. The rear ends of said frame-bars may be secured to the vertical shanks or standards B B of the rear-wheel spindles, as shown, said standards being formed or provided with clamping devices or sleeves $b\ b$, which are fitted upon the rear cross-bar $A^3$ and adapted to be adjusted and secured at any desired point along the length of said cross-bar for the purpose of securing the rear ends of the said frame-bars A at the desired distance apart.

The driver's seat C is preferably mounted on the cross-bar $A^3$, as shown.

It will be observed that the rear ends of the disk-supporting frame-bars are supported at the desired height by the standards or uprights rising from the spindles of the rear wheels D D, while the front ends of said frame-bars are fixed to the front cross-bar $A^2$, and that the height of the latter determines the height of the front of the disk-supporting frame, and consequently the depth of penetration of the disks carried by said frame.

In order that the front end of the disk-supporting frame may be raised and lowered to proper carrying and working positions of the disks and to govern and control the depth of penetration of said disks when lowered to working position, the front end of said disk-supporting frame is suspended and held at the desired elevation by means of links $e$, one at each side of said frame, pivotally connecting the same with the short arms of hand-levers E, which latter are preferably pivoted upon brackets F, having inturned apertured ends $f\!f$ (see Fig. 4) to receive the vertical shanks or uprights G, extending from the front-wheel spindles, so that when said levers are rocked the front end of the disk-supporting frame will be either raised or lowered, according to the direction of movement of the levers, each lever being provided with the usual hand-operated thumb-lever or finger-piece and pawl, engaging a rack E' on the bracket F for locking the lever in the desired position.

To guide and hold the front end of the disk-supporting frame in proper position when raised or lowered by the operating-levers E E, slides or sleeves $a^3$ may be fitted on the uprights or standards G of the front-wheel spindles and rigidly connected with or secured to the front end of said frame or to the angle-bars $a$ thereon, as shown, so as to slide upon said uprights between the inturned ends of the brackets F and keep the frame in proper position.

The uprights or standards G of the front-wheel spindles are preferably rotatably fitted in the apertured inturned ends of the brackets F to adapt them to be turned to the right or left, so as to guide the plow in the direction desired, the two wheels being adapted to turn in unison. To this end I may employ a laterally-movable compound bar H, consisting of two parts $h$ $h$, each of which is pivotally connected at its outer end with a crank-arm G', extending from the upper end of the upright or standard G of each wheel-spindle, while their inner ends overlap and are embraced by straps or stirrups $h'$ $h'$, suitably connected with a clamping-iron underneath, so that said compound bar may be lengthened or shortened at will by moving its overlapping portions upon each other and securing them in the desired position by said clamping means $h'$ $h'$, the said compound bar being pivotally connected with the short arm of a hand-lever I, which is mounted on the cross-bar K, by which the upper portions of the front uprights or standards G G are connected, and having the usual thumb-piece for actuating a pawl for engaging a rack L, whereby the lever may be locked in the desired position. By this means the front wheels may be turned in unison to either the right or the left, for the purpose of turning the plow, or said wheels may be locked in a position parallel with the rear wheels by locking the lever in a central position for guiding the plow, as may be necessary or desirable in use. The bar K is also preferably formed in two parts, each having a series of perforations therein to receive suitable fastening-bolts, the outer end of each part being secured to the upper end or portion of one of the uprights or standards G, while their inner ends overlap and are adjustably secured together by bolts passing through the registering apertures therein, though other means may be employed for connecting and securing said parts together.

It will be seen that the front wheels may be spread apart, as shown in Fig. 3, or brought nearer together, as shown in Figs. 1 and 2, to accommodate the increased width or narrowing of the disk-supporting frame proper, by merely lengthening or shortening the compound bars H and K, as described, thus regulating the distance between furrows to suit the desires of the user or the requirements of the use to which the implement may be put.

In order that the disks P may be supported above ground when desired, as in transporting the machine from place to place, and readily lowered into working position, they are preferably journaled in the lower portions of vertically-movable slides M, each of which is fitted in a bracket or casting N, which may be bolted or otherwise secured to the frame-bar A, as shown. The disks are set opposite each other, so that the sidewise pressure or thrust exerted by one in turning a furrow is counterbalanced by the opposing pressure of the other. Each bracket or casting N is preferably formed with guideways or grooves $m$ to receive and guide the slide M in its vertical movements and with an ear or lug $m'$, having an aperture to receive a journal-pin or crank-arm $o$ of a crank-lever O, by means of which the slide M, and with it the disk P, may be raised and lowered at will, this being accomplished by providing a pin $o'$ on the outer end of said crank-arm, which takes under a cleat or ledge $o^2$ on the inside of the slide M, at or near its upper end, so that in one position of said crank-lever, Fig. 6, the disk will be in its lowermost or working position, while in another position (indicated in dotted lines in Fig. 7) the disk will be raised and supported in such position. In the latter position it will be observed the crank-pin will be thrown a little past the pivotal center of the crank-arm, so that the lever will be locked and retained in such position by the weight of the disk.

The disks are shown provided with scrapers Q, the shanks of which are supported by arms secured to the slides M.

I thus provide a very efficient yet simple and comparatively inexpensive disk plow especially designed for working crops planted in rows or ridges and the like. The implement, though well adapted for other uses and so intended, is primarily designed to throw up beds or ridges for sugar-cane. On many plantations such ridges have heretofore been laid out with great care many years ago and have been preserved from year to year without appreciable variation. These ridges vary from five to seven feet from center to center, and when ready for the plow the field presents to the eye the appearance of regular undulations resulting from the alternating ridges and hollows. The first operation of the bedding-plow when its disks or other furrow-turning devices are set, say, at the widest point of adjustment, as indicated in Fig. 3 of the drawings, is to straddle the row or ridge and slice off a furrow from each side thereof, throwing each furrow into the middle, thus partly filling up the middle or hollow between adjacent ridges. A second plowing with the disks or plows set as closely together as possible, or as indicated in Fig. 2 of the drawings, throws another furrow-slice each way on top of the last furrow. This may still leave a ridge when disks are employed as the furrow-turning devices for the reason that the disks cannot be set so closely together as to cut the land away entirely, and in that case the final ridge may be thrown one-half of it each way by the passage through it of a "middle-breaker" or common ridging-plow—i. e., a plow with a double moldboard and share—which throws one furrow to the right and another to the left at the same time. The net result of these operations is that the dirt which originally formed the ridge operated upon has been thrown one-half to the right and one-half to left, where in each case it has formed the half of a new ridge in the space formerly occupied by the "middle," so that where the ridge first stood there is now a new valley or, technically speaking, a "middle." By treating the adjacent ridges in the same way the half ridges will be completed, and when the field has all been gone over its surface will be composed of a new set of ridges where the middles formerly were and a new set of middles where the ridges formerly were. In other words, the ridges and middles will have changed places and the beds will have been reversed. Where the ridges are narrow, one trip with the disk-bedder and one round with the middle-breaker plow may accomplish the work. Time may be saved by plowing the whole field first with the disks or furrow-turning devices separated from each other, then with the disks or furrow-turning devices closed or brought close together, and finally with the middle-breaker or ridging-plow when the latter is necessary. By means of the adjustable frame the distance between the furrows may be regulated at will.

It is apparent that I can, if desired, substitute for the disks any suitable or preferred form of right and left hand turning-plows and still obtain the same or substantially the same results in throwing up beds or ridges in the manner and for the purpose described. In this substitution the remaining devices or operative mechanism can still remain the same in every essential respect.

Other forms of levers may be employed for raising and lowering the disks or plows and their supporting-frame, and other means may be employed for changing the width of the frame and securing the overlapping cross-bars in different positions, and various other changes may be made in the details of construction and arrangement of parts without departing from the spirit and scope of my invention, and hence I do not desire to be limited to the specific construction and arrangement of parts described and shown.

Having thus fully described my invention, what I claim as new, and desire to secure by Letters Patent of the United States, is—

1. A bedding-plow comprising two longitudinal frame members separably secured together, each carrying supporting-wheels at its front and rear ends mounted on independent spindles secured thereto and movable laterally therewith, and each having an intermediate furrow-turning device, and means for adjusting said members laterally and securing them at different distances apart, substantially as described.

2. A bedding-plow comprising a laterally-adjustable frame composed of a pair of separable longitudinal frame-bars, carrying clamping devices at their front and rear ends, and front and rear cross-bars on which said clamping devices are adjustably secured, supporting-wheels for each frame-bar mounted on independent spindles attached to the front and rear ends thereof and movable laterally with said frame-bar, and furrow-turning devices carried by said frame-bars, substantially as described.

3. A bedding-plow comprising a pair of longitudinal frame members separably secured together side by side, each carrying a furrow-turning device, means for adjusting said members laterally and securing them at different distances apart, rear supporting-wheels mounted on spindles attached to the rear ends of said members, front supporting-wheels mounted on spindles provided with vertical shanks adjustably attached to the front ends of said members, and means for raising and lowering the front ends of said members on said shanks and securing them at the desired height, substantially as described.

4. A bedding-plow comprising a pair of longitudinal frame members separably secured together side by side, each carrying a furrow-turning device, means for adjusting said members laterally and securing them at different distances apart, rear supporting-wheels mounted on spindles attached to the rear ends of said members, vertical sleeves rigidly attached to the front ends of said members, front supporting-wheels mounted on spindles having vertical shanks slidably fitted in said sleeves, hand-levers fulcrumed on supports carried by said shanks and having their short arms secured to and suspending the front ends of said frame members, and racks on said support and locking devices on said levers for holding the latter in desired position, substantially as described.

5. A bedding-plow comprising a pair of longitudinal frame members separably secured together, each carrying a furrow-turning device, means for adjusting said members laterally and securing them at different distances apart, rear supporting-wheels, and front supporting-wheels mounted on spindles having vertical shanks rotatably fitted in sleeves carried by the front ends of said members, an adjustable or extensible bar the ends of which are pivotally secured to said shanks, rigid arms projecting from said shanks, and a second adjustable or extensible bar parallel with the first and having its ends pivotally secured to said arms, and means for shifting the second adjustable bar laterally, thereby turning both front wheels in unison, substantially as described.

6. A disk bedding-plow comprising a plurality of frame-bars supported on wheels at their ends, each carrying a concavo-convex cutting-disk, said disks being set opposite each other with their convex surfaces confronting, means for raising and lowering said disks and maintaining them at different elevations, and means for adjusting and securing the frame-bars at different distances apart to vary the distance between the disks; substantially as described.

7. A disk-supporting frame having a bracket thereon with vertical guideways therein, in combination with a vertically-movable slide fitted in said guideways and having a disk journaled thereto, and a crank-lever pivoted to said bracket with its crank-arm supporting said slide and arranged to be thrown past the center of its journal when the disk is raised so as to lock and retain the lever by the weight of the disk; substantially as described.

8. In combination with the plow-supporting frame, the bracket having integral vertical guideways therein, and an apertured extension or ear at its upper end, a vertically-movable slide working in said guideways and carrying a furrow-turning device at or near its lower end, and a crank-lever having its axle journaled in said apertured ear and its short arm supporting said slide for raising and lowering said furrow-turning device; substantially as described.

9. In combination with the plow-frame and its supporting-wheels, the uprights rising from the front-wheel spindles and having projecting parallel arms, the extensible bar connecting said uprights, a second extensible bar arranged parallel with the former and connecting said parallel arms, and a lever pivotally connecting said extensible bars, whereby said front wheels may be turned in unison to either right or left to guide the plow; substantially as described.

10. In combination with the laterally-adjustable plow-frame, and its rear supporting-wheels, the front wheels, the uprights rising from the front-wheel spindles, the extensible bar connecting the upper parts of said uprights, a second extensible bar connecting a pair of crank-arms projecting from the upper parts of said uprights, means for suspending the front end of the plow-frame and raising and lowering the same with respect to said front wheels, and a lever having a pivotal connection with said second extensible bar for moving said crank-arms and wheel-spindles so as to turn said front wheels in unison to either the right or left to guide the plow in turning or otherwise; substantially as described.

11. A bedding-plow comprising a pair of longitudinal frame members separably secured together, each carrying a furrow-turning device, means for adjusting said members laterally and securing them at different distances apart, rear supporting-wheels, front supporting-wheels carried by vertical rotatable standards, means for turning both standards in unison, means for raising and lowering the front ends of the frame members on said standards, and an independent lifting and lowering device for each furrow-turning device, substantially as described.

In testimony whereof I affix my signature in presence of two witnesses.

STALEY D. POOLE.

Witnesses:
CHAS. H. POPE,
CHAS. T. MOREY.